United States Patent [19]

Yie et al.

[11] Patent Number: 4,458,721

[45] Date of Patent: Jul. 10, 1984

[54] PIPELINE FLOW RESTRICTOR

[75] Inventors: Gene G. Yie, Auburn, Wash.; Thomas M. Bevan, Homewood, Ill.

[73] Assignees: Brooklyn Union Gas Company, Brooklyn, N.Y.; Columbia Gas Systems Service Corporation, Wilmington, Del.

[21] Appl. No.: 295,488

[22] Filed: Aug. 24, 1981

Related U.S. Application Data

[63] Continuation-in-part of Ser. No. 16,025, Feb. 28, 1979, Pat. No. 4,291,727.

[51] Int. Cl.³ ............................................. F16L 55/12
[52] U.S. Cl. ..................................... 138/93; 138/89; 138/40; 138/45; 138/46; 137/318
[58] Field of Search ....................... 138/89, 93, 94, 40, 138/45, 46; 137/317, 318, 319

[56] References Cited

U.S. PATENT DOCUMENTS

| | | | |
|---|---|---|---|
| 1,506,418 | 8/1924 | Evensta et al. | 138/93 X |
| 1,906,151 | 4/1933 | Goodman | 138/93 |
| 2,285,392 | 6/1942 | Cline | 138/94 |
| 2,843,154 | 7/1958 | Hosking | 138/93 |
| 3,498,333 | 3/1970 | Jones | 138/93 |
| 3,842,864 | 10/1974 | Riegel et al. | 138/94 |
| 3,870,085 | 3/1975 | Schneider | 138/93 |
| 4,144,908 | 3/1979 | Dunn | 138/93 |

FOREIGN PATENT DOCUMENTS

| | | | |
|---|---|---|---|
| 22591 | of 1898 | United Kingdom | 138/93 |
| 188695 | 11/1922 | United Kingdom | 138/93 |

Primary Examiner—James E. Bryant, III
Attorney, Agent, or Firm—Thomas W. Speckman

[57] ABSTRACT

An apparatus and process for restricting fluid flow in a pipeline. An improved inflatable sleeve flow restricting apparatus is disclosed which in one embodiment has restrictor arms extending from one or both ends of the flow restrictor cartridge for engagement with the pipeline side wall at their other ends restricting the inflation of the inflatable sleeve thereby allowing inflation to greater inflation fluid pressures providing pipeline fluid flow restriction in pipelines having pressures of up to about 125 psig. A combination boring-insertion tool is described which utilizes fluid pressure to provide force for the hole cutter.

22 Claims, 16 Drawing Figures

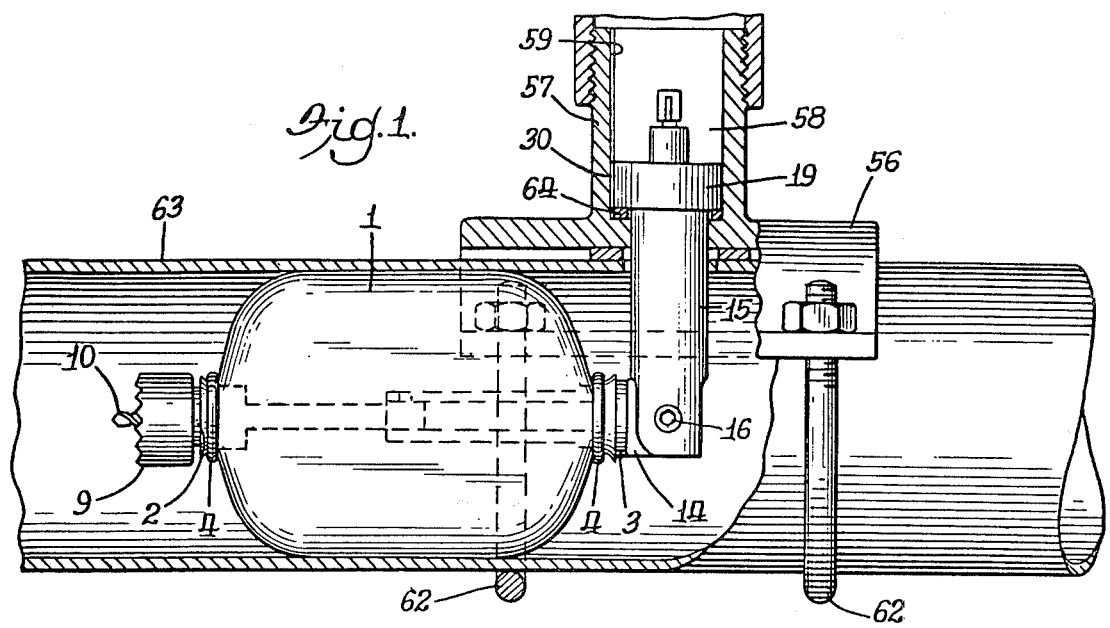
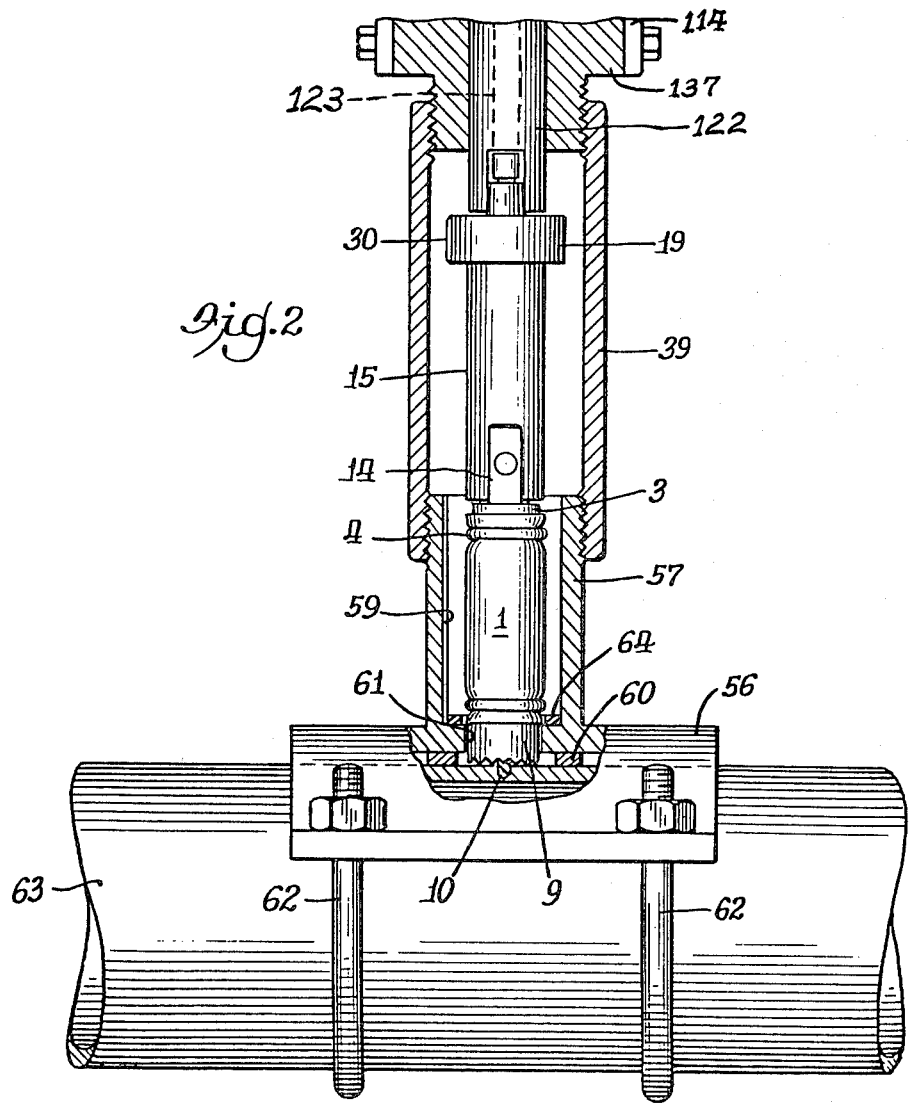

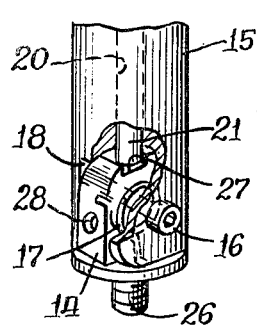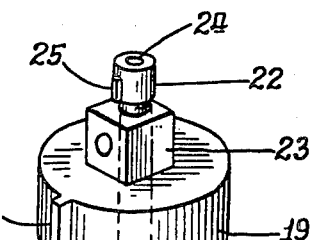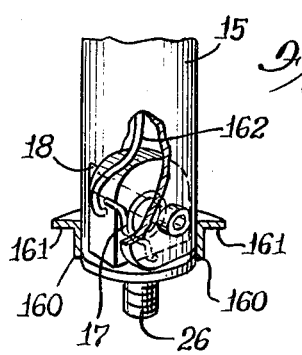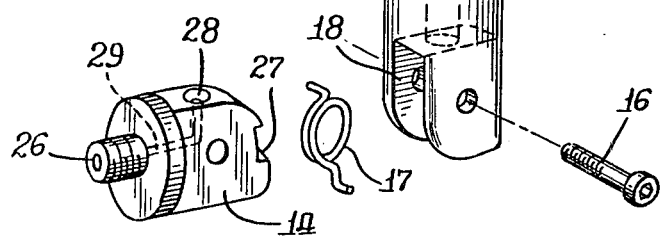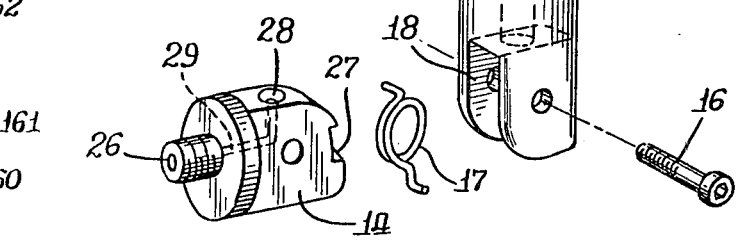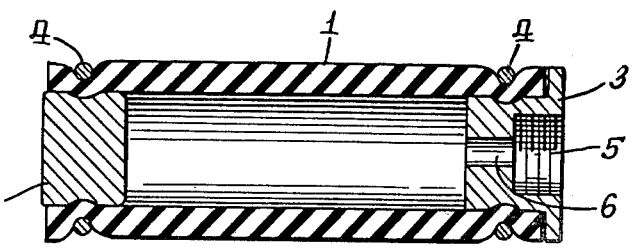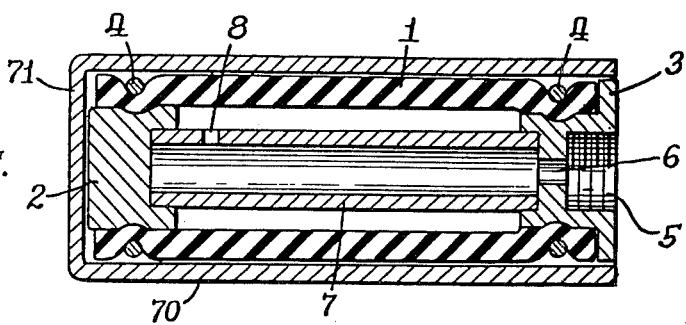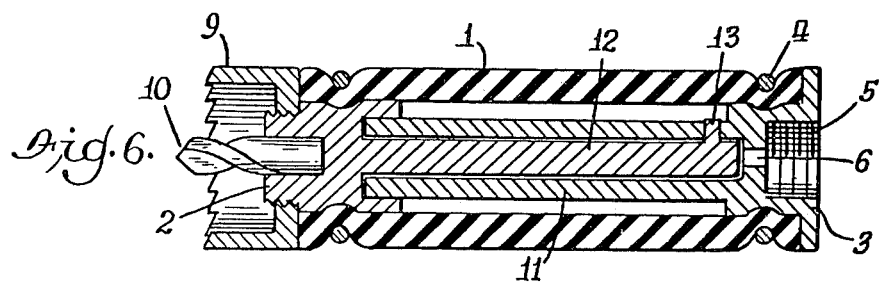

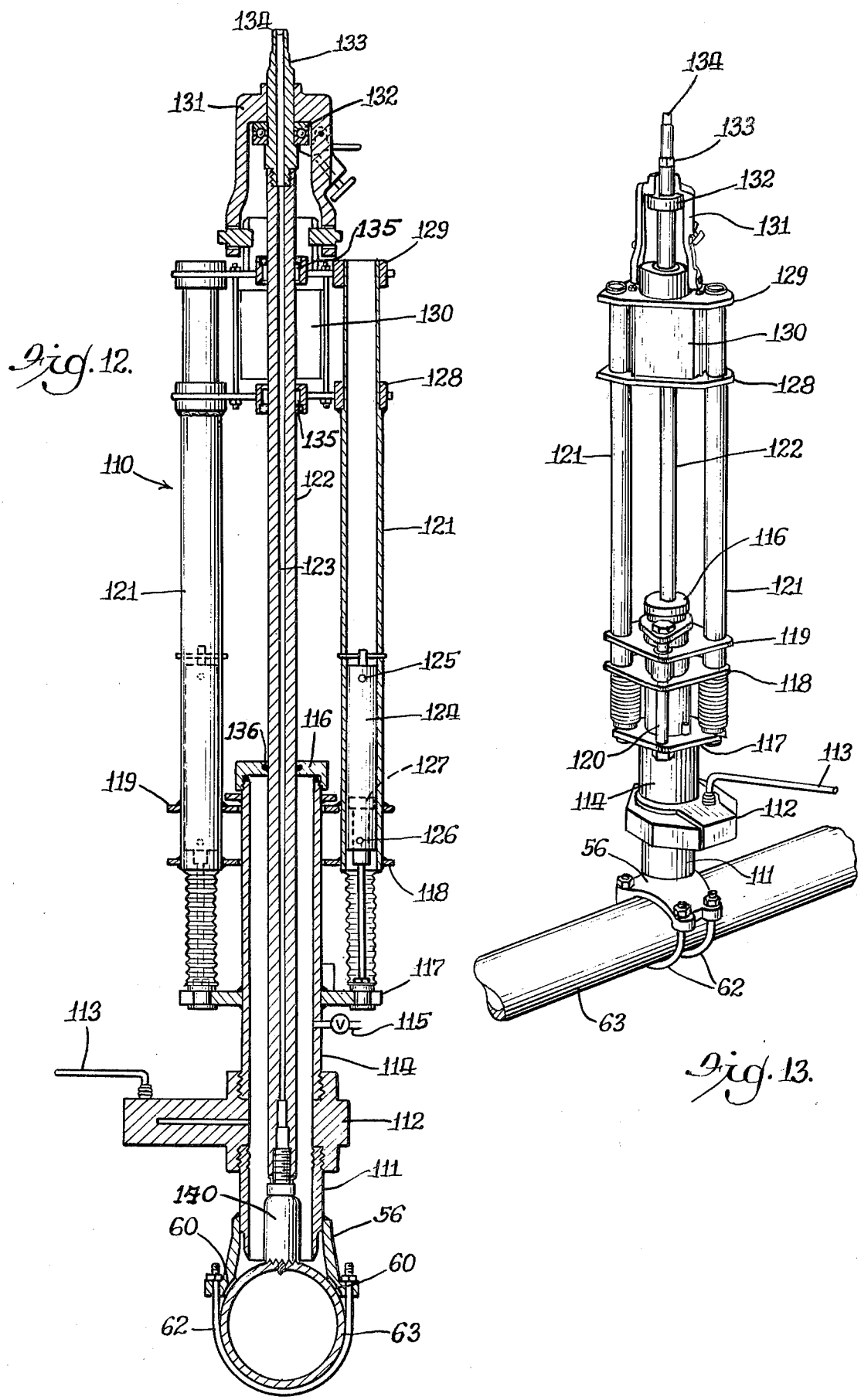

PIPELINE FLOW RESTRICTOR

CROSS REFERENCE TO RELATED APPLICATION

This application is a continuation-in-part application of our earlier filed application, Pipeline Flow Restrictor and Process, Ser. No. 16,025, filed Feb. 28, 1979 now U.S. Pat. No. 4,291,727.

BACKGROUND OF THE INVENTION

1. Field of the Invention

This invention relates to an apparatus and process for restricting fluid flow in a pipe. More particularly, this invention relates to an apparatus and process for rapidly controlling fluid flow in a pipeline in cases of leaks or the necessity for repairs or maintenance. The apparatus and process of this invention relates in one embodiment particularly to an improved sleeve for insertion, through a side wall hole of substantially less diameter than the diameter of the pipeline, into a pipeline where it is inflated thereby restricting flow of fluid within the pipeline and a method of its insertion into the pipeline.

Flow control valves frequently are available along a pipeline and closing of the valves for isolation of a damaged section of a pipeline will reduce the loss of fluid. However, such valves in most pipelines are spaced far apart, frequently many miles apart, rendering effective restriction of the pipeline under emergency conditions impractical through use of such valves and of inconvenience to all customers being served by that section of pipeline. Even when the flow control valves are closed and a ruptured section of pipeline isolated, the static pressure within the pipeline will cause the fluid to flow out of the rupture resulting in loss of a large amount of fluid. Thus, it is highly desirable that the flow of fluid inside the pipeline be stopped or restricted across a short distance at the point of damage or rupture. Frequently the maintenance of a pipeline requires temporary restriction of fluid flow within the pipeline. If flow control valves are not present at desired locations, pinching of the pipeline with mechanical or hydraulic tools to halt the flow has been practiced. However, such operation can weaken the pipe or require the pinched section to be replaced subsequent to the other maintenance. The installation of temporary valves near the rupture site or the maintenance site is practiced. In both gas and water distribution systems, there is a need to have an easy and versatile device and method to halt the flow of fluid within a short distance of a break or maintenance point.

2. Description of the Prior Art

A wide variety of devices and methods have been used to stop fluid flow in pipelines. One group of methods that has been used for stopping low pressure flow involves the direct injection of material such as viscous grease and expandable foams. Such methods are applicable only to pipelines operating at pressures in the order of 1 psi and less and has the serious disadvantage of necessity of removal of the injected material to re-open the pipeline.

Another method currently used by the gas distribution industry, involves the insertion of a rubber bag through the pipe side wall upstream from a leak or desired work point and subsequent inflation of the bag with compressed gas to effect a seal inside the pipe. Such rubber bags may be sperical in shape such as the "Gardner-Goodman Stopper" as sold by Safety Gas Main Stopper Co., Inc., Brooklyn, N.Y., or they may be cylindrical shaped such as the "Goodman Cylindrical Stopper" as sold by Safety Gas Main Stopper Co., Inc. However, the inflatable bags only are useful under low pipeline pressures, generally under 5 to 10 psi and considerably less with large diameter pipes. Attempts have been made to increase operability of inflatable stopping devices under higher pressures by insertion through a separate hole of a device having multiple blades which mechanically open to cover a substantial portion of the cross-sectional area of the pipeline. When used in conjunction with inflated bags, such a device uprates the pressure at which the stopping device may be used to a maximum of about 30 psig, as compared with the inflatable bag alone. Such devices which are suitable for insertion through side wall fittings are more fully described in the article, "An Improved Flow-Stopping System for Distribution Main" by A. R. Caruthers and D. R. Casson, I.G.E. Journal, pp. 183–192, June 1973. Another inflatable bag-type line stopper insertable through the pipe side wall is disclosed in U.S. Pat. No. 3,842,864.

Other expandable pipe plugs of the type inserted through an open end of the pipe or through a pipe fitting, such as an elbow, a Y or a T, having an opening substantially the same diameter as the pipe to have its flow restricted are described in U.S. Pat. Nos. 4,144,908, 3,498,333 and 2,843,154. U.S. Pat. No. 3,870,085 describes expansible plugs for sewer pipes which plugs have rigid end discs of a diameter about 75 percent the diameter of the pipe. The pipe plugs disclosed in these patents are only suitable for insertion through an open end of the pipe or through a fitting having an opening near the size of the pipe itself and are entirely unsuited for insertion through a hole drilled in the pipe side wall which hole has a diameter substantially smaller than the diameter of the pipe itself.

SUMMARY OF THE INVENTION

An apparatus and process for restricting fluid flow in a pipeline by inflation of an expandable, flexible sleeve portion of a flow restrictor cartridge having an overall deflated diameter of about 20 to 50 percent of the inside diameter of the pipeline in which it is to be used is described together with a cartridge insertion tool providing minimal loss of pipeline contents upon boring a hole in the pipeline, followed by insertion and inflation of the flexible sleeve for restricting fluid flow in the pipe. There are several embodiments of suitable flow restrictor cartridges including those having expandable sleeve retainer arms pivotally mounted so as to pivot outwardly against the interior wall of the pipeline at an angle of about 40° to about 60° with the axis of the flow restrictor cartridge thereby restricting axial expansion of the flexible sleeve upon its inflation and providing higher pressurization of the flexible sleeve for use in pipelines of pressures up to over about 125 psi. The flow restrictor cartridges may be used in combination with an insertion assembly and by placement of a boring tip on the flow restrictor cartridge may be used in conjunction with a cartridge insertion tool providing a one step operation with minimal loss of pipeline contents upon boring a hole in the pipeline followed by insertion and inflation of the flexible sleeve for restricting fluid flow in the pipe.

It is an object of this invention to provide an expandable cartridge apparatus and process for restricting pipeline flow which overcomes many of the disadvantages of the prior art devices.

It is another object of this invention to provide an apparatus and process for restricting pipeline fluid flow providing easy insertion and withdrawal of the expandable cartridge, with reduced leakage of the pipeline fluid, through a single hole in the side wall which has a diameter about 20 to about 50 percent of the diameter of the pipeline.

It is still another object of this invention to provide an expandable cartridge apparatus and process for restricting pipeline flow at pipeline fluid pressures of up to about 75 to 125 psi.

It is yet another object of this invention to provide an apparatus for rapid flow shutdown of a pipeline which provides integral means of cutting a hole through the pipe wall to gain access to the interior of the pipeline with reduced fluid leakage.

It is still another object of this invention to provide a rapid flow shutdown apparatus and process which is operable with gas or liquid fluids and with pipelines of varying materials of construction.

BRIEF DESCRIPTION OF THE DRAWINGS

These and other objects and advantages of this invention will become apparent from the following description taken in conjunction with the accompanying drawings showing preferred embodiments wherein:

FIG. 1 is a partially sectioned view of an inflated flow restrictor cartridge of one embodiment of this invention in place in a pipeline;

FIG. 2 is a partially sectioned view of one embodiment of the lower end of a cartridge insertion tool of one embodiment of this invention within a saddle attached to a pipe;

FIG. 3 is an expanded perspective view of bendable elbow portion of the cartridge insertion tool for positioning the flow restrictor cartridge of this invention;

FIGS. 3A and 3B are partial cutaway views of the pivot area of cartridge insertion tools showing different embodiments of means for maintaining the bendable elbow in parallel relation and of different embodiments for providing pressurized inflation fluid to the flow restrictor cartridge;

FIGS. 4-9 are sectional views of various embodiments of flow restrictor cartridges according to this invention;

FIG. 12 is a partially sectioned view of one embodiment of a cartridge insertion tool of this invention; and FIG. 13 is a perspective view of the cartridge insertion tool shown in FIG. 11.

DESCRIPTION OF THE PREFERRED EMBODIMENTS

Figure 11:
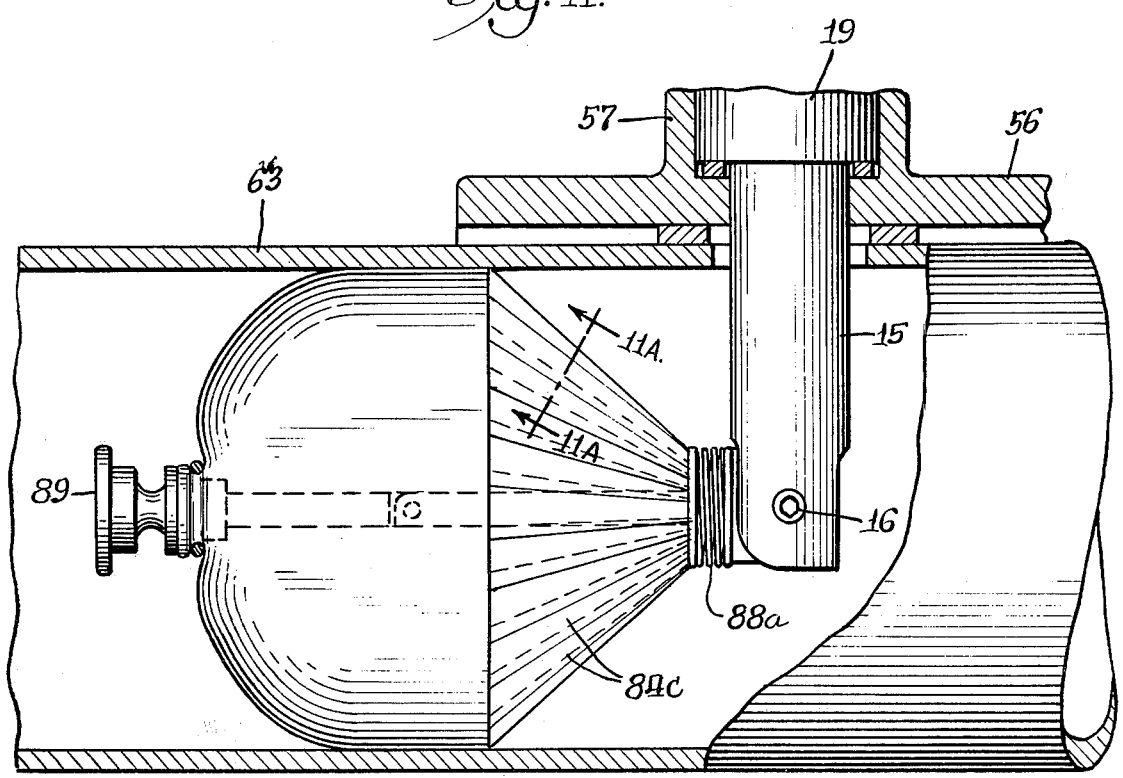
FIG. 11 is a partially sectioned view of another embodiment of a flow restrictor cartridge according to this invention in place in a pipeline.

Referring to FIGS. 4-9, various embodiments of flow restrictor cartridges of this invention are shown. The flow restrictor cartridges have a substantially circular rigid front end plug and a substantially circular rigid rear end plug which is fastened to a cartridge elbow and a cylindrical radially expandable flexible sleeve having an opening in the central portion of one end which is attached in substantially fluidtight relation to the periphery of the rear end plug at the one end and the front end plug at the other end. The flexible sleeve is inflatable by passing pressurized gas or liquid through the rear end plug into the interior of the flexible sleeve inflating it to completely fill the diameter of the pipe thereby restricting fluid flow in the pipe. The flow restrictor cartridges have an overall deflated diameter about 20 to about 50 percent the inside diameter of the pipe and preferably about 25 to about 40 percent. By the addition of sleeve retainer arms which are pivotally mounted in the periphery of at least one of the end plugs and adapted to pivot outwardly to extend against the interior wall of the pipeline at an angle of about 40° to about 60° with the axis of the flow restrictor cartridge, the axial expansion of the flexible sleeve upon inflation is restricted and the flow restrictor is able to withstand considerably greater fluid forces in the pipeline. In one embodiment flat sleeve retainer arms are in the form of a conical iris diaphragm which when pivoted outwardly against the interior wall of the pipeline cover up to all the area of an end of the expandable flexible sleeve when inflated. The flow restrictor cartridge length is less than the inside diameter of the pipeline in which it is to be used or has a multi-section member passing through the central portion of the sleeve, each of the sections pivotally engaged with the adjacent section and each such section having a length less than the inside diameter of the pipeline so that the flexible cartridge may be inserted through a hole in the side wall of the pipeline.

FIG. 4 shows a flow restrictor cartridge of simple construction which is formed by plugging the ends of a suitable length of cylindrical expandable flexible sleeve 1 of suitable thickness and properties with a front end plug 2 and a rear end plug 3. The expandable flexible sleeve 1 is attached to the two end plugs by means of compression rings 4, or other suitable devices that permit expansion of the flexible sleeve to obtain a fluidtight seal within a pipe. Rear end plug 3 has threaded receiving cylinder 5 and flow passage 6 in the central portion. While the front and rear end plugs are referred to as "substantially circular", the term is meant to include any smooth periphery, such as circular or elliptical to provide substantially fluidtight attachment of the flexible sleeve.

FIG. 5 shows a flow restrictor cartridge having hollow central cylinder 7 connecting front end plug 2 with rear end plug 3 to provide greater rigidity. Central cylinder 7 may or may not be rigidly attached to front end plug 2, depending on whether extension of the cartridge upon inflation is desired. If central cylinder 7 is rigidly attached to front end plug 2 and rear end plug 3, bleed hole 8 is necessary to provide passage of fluid for inflation of the flexible sleeve. Flexible protective sleeve cylinder 70 is shown in protective position over the flexible sleeve and may have end cap 71 or be open at both ends. Protective sleeve 70 need not be gas tight and is easily replaceable if damaged, providing abrasion protection from the pipe wall to expandable flexible sleeve 1. The protective sleeve may be used in conjunction with any of the flow restrictor cartridges of this invention.

FIG. 6 illustrates a flow restrictor cartridge having hole cutter 9 and drill bit 10 attached to front end plug 2. Front end plug shaft 12 fits within torque transmitting cylinder 11. Shaft 12 has engaging pin 13 which engages torque transmitting cylinder 11 while permitting lengthwise sliding of shaft 12 within cylinder 11 when the flexible sleeve is extended upon inflation. Such a slot also serves for passage of fluid for inflation of the flexible sleeve.

Figure 7:
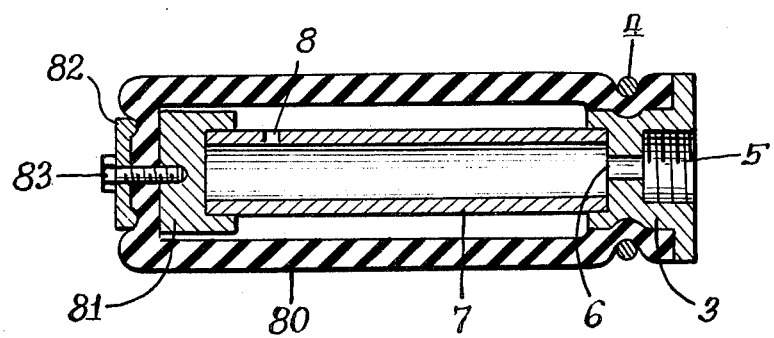

FIG. 7 shows use of closed end flexible sleeve 80 in combination with front end plug 81 and washer 82 attached by screw 83. The attachment of flexible sleeve 80 to front end plug 81 may also be made with a compression ring as more completely disclosed above, or any other suitable means.

Figure 8:
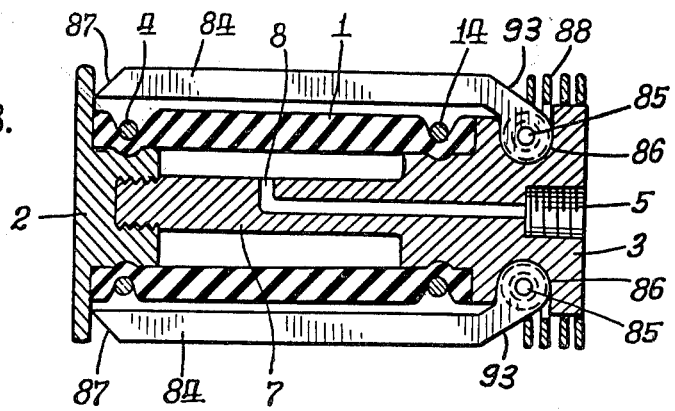

FIG. 8 shows a flow restrictor cartridge suitable for use in pipelines having higher gas pressures than those in which the above described flow restrictor cartridges may be used. Sleeve retainer arms 84 have pivot portion 85 at one end and angular surface 87 at the other end. Retainer arm pivots 85 are maintained in rotatable fashion within sockets 86 in rear end plug 3. Spring 88, fixed on rear end plug 3, acts upon wedge surfaces 93 to urge sleeve retainer arms 84 to the position shown in FIG. 8. Other return means, such as an elastic O ring may be substituted for spring 88. Upon inflation of flexible sleeve 1, the pressure of sleeve 1 moves sleeve retainer arms 84 outwardly by rotation of pivot portion 85 in socket 86. Sleeve retainer arms 84 may be of any shape and number and pivots 85 of any suitable configuration to provide retainer arms extending to and against the inside side wall of the pipeline to provide firm resistance to further expansion of flexible sleeve 1, thereby increasing the pressure of the flexible sleeve against the pipe side wall.

Figure 9:
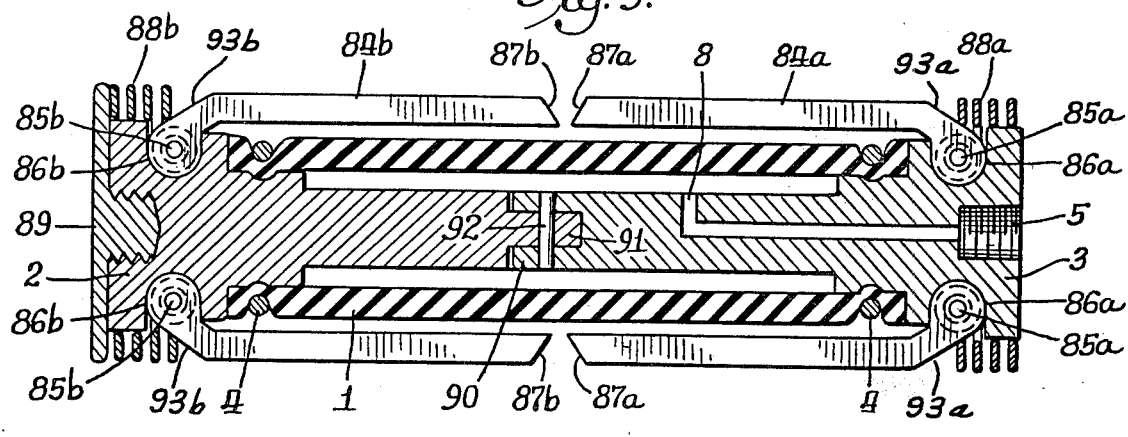
Figure 10:
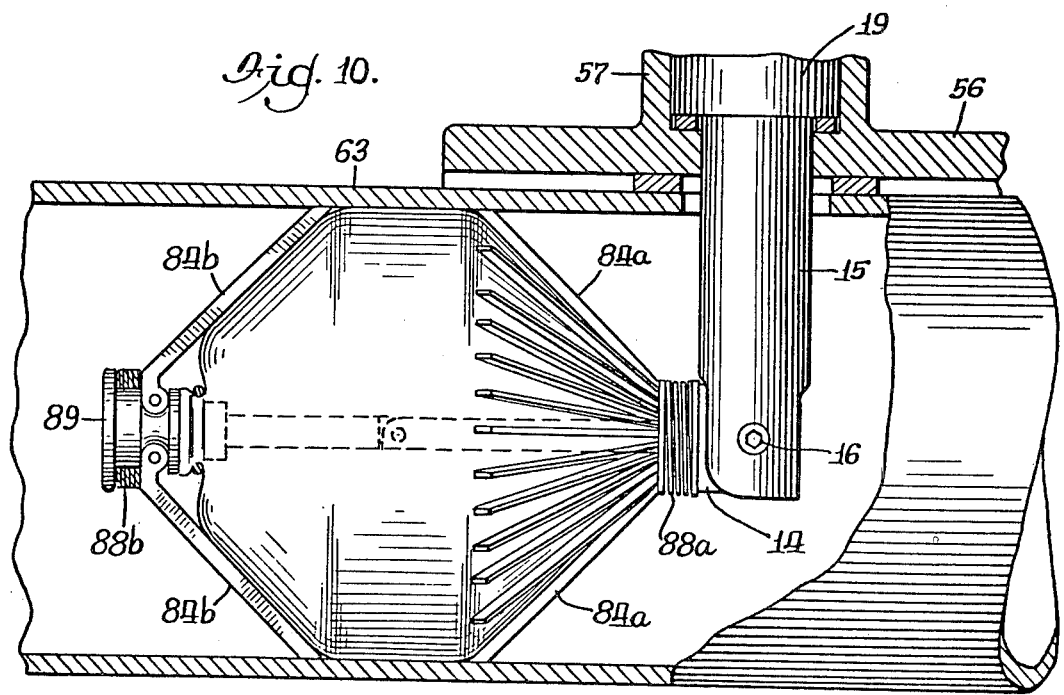
FIG. 10 is a partially sectioned view of the flow restrictor cartridge of FIG. 9 in place in a pipeline.

FIG. 9 shows an embodiment of a flow restrictor cartridge having sleeve retainer arms extending from each end of the cartridge. The numerals in FIG. 9 have the same meaning as previous figures, the duplicated parts relating to the dual set of sleeve retainer arms having suffixes "a" at the rear end and "b" at the front end. Spring 88b is retained by spring retainer 89 and spring 88a is retained by cartridge elbow 14. FIG. 9 also shows a cartridge in which the front and rear end plugs are attached to a multisection member passing through the central portion of the flexible sleeve with each of the sections pivotally engaged with an adjacent section and each of the sections having a length less than the inside diameter of the pipeline in which it is to be used to permit use of a cartridge longer than the pipe diameter. A spring loaded bending action, the same as provided between cartridge elbow 14 and cartridge adapter 15, is provided by parallel sided rear section 91 of front end plug 2 fitting within rear end plug section saddle 90 for rotation about pivot pin 92. A spring similar to 17, not shown in FIG. 9, provides force to urge front end plug to an angular position with rear end plug to aid insertion into the pipeline. Retainer arms 84 may cover up to about 75 percent of the end area of the inflated sleeve. FIG. 10 shows the restrictor flow cartridge of FIG. 9 inflated in place in a pipeline.

Figure 11A:
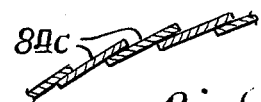
FIG. 11A is a partial section view at 11A—11A indicated in FIG. 11.

FIG. 11 shows another embodiment of a flow restrictor cartridge in inflated condition in a pipeline. The flow restrictor cartridge shown in FIG. 11 has retainer arms 84c extending only from the rear end plug to the inside surface of the pipeline. The flat retainer arms shown in FIG. 11 are in the form of a truncated conical iris diaphragm which, when extended outwardly press against the interior wall of the pipeline and cover a substantial portion, up to 100 percent, of the area of the end of the flexible sleeve when inflated. Retraction spring 88a or any other suitable means for automatic retraction of the retainer arms to the position shown in FIG. 8 may be used. While shown in FIG. 11 as being attached to the rear end plug, similar retainer arms may be attached only to the front end plug or to both end plugs. FIG. 11A shows in cross section flat retainer arms which overlap and as shown cover the entire end area of the inflated restrictor. When flat retainer arms are used, it is preferred that they cover more than seventy-five percent of the end area of the inflated restrictor cartridge flexible sleeve. Cylindrical protective cover sleeves may be used over sleeve 1 and beneath retainer arms 84 in any of the flow restrictor cartridge embodiments with retainer arms to provide protection against abrasion and pinching.

Any elastomer material including natural and synthetic rubbers may be used for flexible sleeve 1 as long as it provides sufficient elongation and residual strength under elongation to allow a relatively small cartridge to be inserted into a relatively large pipe without significantly weakening the strength of the pipe. Examplary of suitable materials are natural latex rubber, butyl rubber, neoprene and nitrile rubber. Preferred pure latex rubber, containing no filler, provides a tensile strength of 3000–5000 psi; elongation to break of 500–900%; modulus at 100% elongation of 40–120 psi; Shore A Durometer hardness of 30–50; and specific gravity of about 0.95. The other parts of the flow restrictor cartridge may be fabricated from any metallic or plastic materials providing desired strength and corrosion resistance properties.

FIG. 3 shows a perspective expanded view of a bendable-elbow assembly for positioning the flow restrictor cartridge inside a pipe. Cartridge elbow 14 joins adapter 15 by means of pivot screw 16 and is maintained in position at right angles to cartridge adapter 15 by spring 17 coacting with cartridge elbow 14 and cartridge adapter 15 urging cartridge elbow 14 toward a position perpendicular to cartridge adapter 15. Cartridge elbow 14 may be held in position with its long axis parallel to that of cartridge adapter 15 by suitable retaining means. Cartridge elbow 14 fits within slot 18 at the end of cartridge adapter 15 in a rotatable manner so that it may have its long axis parallel with or at right angles in a single direction to the long axis of cartridge adapter 15. One suitable retaining means is shown in FIG. 3A wherein the end of central passage tube 21 extends into notch 27 at the end of the cartridge elbow pivot means. Another suitable retaining means is shown in FIG. 3B wherein sleeve 160 is slidably engaged over the pivot means to hold cartridge elbow 14 and cartridge adapter 15 in parallel relation. Upon insertion of the insertion assembly through a hole in the side wall of a pipeline, outwardly extending flange 161 at the upper portion of sleeve 160 engages the bottom of the insertion tool adapter or the pipeline itself and cartridge adapter slides through sleeve 160 and cartridge elbow 14 is urged by spring means 17 toward a position perpendicular to cartridge adapter 15. As best seen in FIG. 3, cartridge adapter 15 has central passage 20 passing from one end of the adapter to the other. Central passage tube 21 passes through central passage 20 for fluid communication as well as for holding cartridge elbow 14 in parallel position. Adapter head 19 has ratchet head 23 extending outwardly from its end for engagement with a mating drive means. Ratchet head 23 is shown in FIG. 3 as being square, but may be any polygonal shape adapted to fit a driving means. Central passage tube 21 continues through the central portion of ratchet head 23 to the exterior. Adapter head 19 has an indicator to show the direction of cartridge elbow 14 when it is in an angular position extending in a single direction from cartridge adapter 15. In FIG. 3, indicator ridge 30 serves this purpose, but of course, may be any suitable indicator means. Check valve 22 is in communication at its inward end with central passage tube 21 and has valve stem 24 for opening the valve upon depressing it allowing fluid flow into and through central passage tube 21. Check valve 22 is shown with engagement pin 25 allowing engagement of a valve engaging head in substantially air-tight relation and permitting rotation of central passage tube 21 in a manner so that it may be unscrewed outwardly from ratchet head 23 thereby removing the opposite end from notch 27. When the end of central passage tube 21 is removed from notch 27, the force of spring 17 moves cartridge elbow 14 into a position at a right angle to its former position. Check valve 22 may be generally similar in construction to the valves commonly used in vehicle tires.

Cartridge elbow 14 has threaded cylinder 26 extending from its forward end for engagement with threaded receiving cylinder 5 in rear end plug 3 of a flow restrictor cartridge. One suitable communication means providing communication when the cartridge elbow and adapter cylinder are perpendicular, with the rear plug through flow passage and a fluid pressure supply means is shown in FIG. 3. Mating area 28 provides substantially gas-tight connection between the end of central passage tube 21 and passage 29 which extends from mating area 28 to the exterior of the end of threaded cylinder 26. The end of central passage tube 21 may be brought into substantially gas-tight relationship with mating area 28 by screwing the tube inwardly with the threads in ratchet head 23. Thus, fluid introduced through check valve 22 to central passage tube 21 passes through passage 29 to the interior of a flow restrictor cartridge. Another suitable communication means is shown in FIG. 3B wherein a hole in the central portion of threaded cylinder 26 is in communication with flexible tube 162 allowing the cartridge elbow and adapter cylinder to pivot, the flexible tube being in communication with a fluid pressure supply means at the other end.

The flow restrictor cartridge may be assembled in combination with an insertion assembly comprising a cartridge elbow and a cartridge adapter cylinder. The cartridge elbow has a mating attachment means at one end for mating with the cartridge rear plug attachment means and pivot means at the other end. The cartridge adapter cylinder has pivot means at one end and a flanged adapter head at the other end. The pivot means of the cartridge elbow and the pivot means of the cartridge adapter cylinder engage to provide rotation of the cartridge elbow from a position having its axis parallel to that of the cartridge adapter cylinder to a position extending perpendicular to the axis of the cartridge adapter. Spring means urge cartridge elbow toward a position perpendicular to the axis of the cartridge adapter. Retaining means retain the cartridge elbow in position parallel to the cartridge adapter until the flow restrictor cartridge is inside of the pipeline. Communication means provide communication, when the cartridge elbow and adapter cylinder are in position for inflation of the sleeve, between the rear plug through flow passage and a fluid pressure supply means for inflation of the flow restrictor cartridge flexible sleeve.

FIGS. 12 and 13 show boring and insertion tool 110 for use in conjunction with the fluid flow restrictor and process of this invention. This tool can be used for cutting circular holes through a pipe wall by attachment of a hole cutter directly to the end of the tool itself or for both cutting a hole and inserting a flow restrictor cartridge of this invention into a pipeline by attachment of a restrictor cartridge having a hole cutter attached to the cartridge. Hollow boring rod 122 extends in rotatable and engagable relationship through frictional advancing means, shown in FIGS. 12 and 13 as rotary to linear translator 130, through relief cylinder cap 116, relief cylinder 114, gate valve 112 and saddle adapter tube 111. Boring rod 122 is shown in FIG. 12 with hole cutter 140 attached to the lower end. Yoke 131 allows rotation of boring rod 122 by a tool attached to external attachment means 133 and also provides downward force to boring rod 122 through thrust bearing 132. Yoke 131 engages mounting plate 129. Mounting plates 128 and 129 are fixedly attached to the upper portion of support rods 121 and hold rotary to linear translator 130 in fixed relation to support rods 121 while allowing rotary and linear movement of boring rod 122 within bushings 135.

Support rods 121 are rigidly fastened to guide plates 118 and 119 at their lower portions. Guide plates 118 and 119 slidably engage relief cylinder 114 and boring rod 122 slidably engages relief cylinder cap 116 through bearing-seal 136. Fluid cylinder 124 with double action piston 127 is located in the lower portion of support rods 121. The double action of piston 127 is provided by fluid flowing through supply-exit passages 125 and 126, located above and below the extreme position of double action piston 127, respectively. The fluid and its control is provided by an external pressure and valving system, not shown, which would be readily apparent to one skilled in the art upon reading this description. Supply pressures of fluid for operation of the tool are suitably in the order of about 200 to about 300 psig. Pistons 127 are fixed with respect to movement along the axis of relief cylinder 114 by being fixed to lower support plate 117 which is fixed to relief cylinder 114. Thus, it is seen that fluid pressure upon the lower surface of double action piston 127 pushes boring rod 122 toward pipeline 63 while fluid pressure upon the upper surface of double action piston 127 pushes boring rod 122 away from pipeline 63. While the figures show two support rods 121 with their fluid piston systems, it is readily apparent that three or four similar support rods and fluid systems may be used for heavier duty performance.

Relief cylinder 114 is attached in fluid tight relation at its lower end to gate valve 112 which has an opening about the same as the inside diameter of relief cylinder 114. Gate valve is opened and shut by gate valve handle 113. Gate valve 112 is attached in fluid tight relation at its lower end to saddle adapter tube 111. Saddle adapter tube 111 is attached in fluid tight relation to pipe saddle 56 which is held on the pipe by U-bolts 62. Fluid tight relation is maintained between the interior of saddle adapter tube 111 and the hole cut in pipe 63 by gasket 60.

The embodiment shown in FIGS. 12 and 13 for attachment of boring tool 110 to pipe 63 is preferred since the hole may be drilled in pipeline 63 by hole cutter 140 directly attached to the end of boring rod 122; hole cutter 140 retracted to relief cylinder 114; gate valve 112 closed; the lower end of boring rod 122 exposed to the atmosphere by relief cylinder being first pressure equalized by opening vent valve 115 and unscrewing relief cylinder cap 116 and retracting boring rod 122 from relief cylinder 114 to replace hole cutter 140 by the desired flow restrictor cartridge which is inserted into relief cylinder 114 and cap 116 replaced; and gate valve 112 opened and the flow restrictor cartridge placed within pipe 63. Likewise, after placement of the flow restrictor cartridge within the pipe boring rod 122 may be detached and retracted to relief cylinder 114, gate valve 112 closed, and boring-insertion tool 110 removed until it is desired to remove the restrictor cartridge from the pipe, all with a minimum loss of pipeline fluid.

Another embodiment which may be used for attachment of the boring-insertion tool to pipeline 63 is shown in FIGS. 1 and 2. In this embodiment the hole cutter must be attached to the end of the flow restrictor cartridge and when finally capping the hole in the pipeline there may be some pipeline fluid loss. Pipe saddle 56 has cylinder 57 extending therefrom for threadable engagement with the threads in the lower end of adapter cylinder 39. Pipe saddle 56 has circular opening 61 sized to permit passage of hole cutters and flow restrictor cartridges as used in this invention. Gasket 60 is placed around opening 61 between pipe saddle 56 and pipe 63 to provide a substantially gas-tight seal between pipe 63 and the chambers formed by cylinder 57 and adapter cylinder 39. U-bolts 62 secure pipe saddle 56 to pipe 63. Boring rod 122 is shown passing through bearing adapter plug 137 at the lower end of cylinder 114. Pipe saddle 56 is sized so that the curvature of the pipe saddle will fit the curvature of the pipe wall and differences in such curvature may be accommodated by gasket 60 which may also be of suitable thickness to assure the center line of the flow restrictor cartridge being along the center line of pipe 63.

Pressurized fluid for inflating the flexible sleeve of the flow restrictor cartridge is supplied through flow passage of the rear end plug of the flow restrictor to the interior portion of the flexible sleeve by communication with a suitable supply means. Fluid passage 123 extends through the central portion of boring rod 122. At its upper end, fluid passage 123 has fluid line coupling 134 for attachment to the fluid supply means. At its lower end, fluid passage 123 has a suitable connection such as a threaded coupling for attachment to the upper part of cartridge adapter 15 by replacement of hole cutter 140 as shown in FIG. 12. The connection may also be a socket connection as shown in FIG. 2. In order to use the cartridge insertion assembly as shown in FIGS. 3 and 3A, a separate feed tube may be used in fluid passage 123 as more fully described in our allowed parent application identified above and incorporated herein fully by reference. The feed tube has a rotation knob at its upper end to enable rotation and a spring coacting between the top of boring rod 122 and the rotation knob to maintain the feed tube in upward position inside boring rod fluid passage 123. At the lower end, the feed tube has a valve engaging head for engagement with check valve 22 of cartridge adapter 15. (FIG. 3) An engaging slot in the valve engaging head engages engagement pin 25 of check valve 22 to provide means for rotation of central passage tube 21. The lower end of boring rod 122 is provided with ratchet heat engagement socket adapted for engagement with ratchet head 23 of the bendable elbow assembly.

The rotary-linear translator 130 may be any suitable means to lower or raise boring rod 122. For example, Roh'lix ® systems sold by Barry Wright Corp., Watertown Mass., and described in U.S. Pat. No. 3,272,021 and Amacoil/Uhing Transverse sold by Amacoil Machinery, Inc., New Rochelle, N.Y., and described in U.S. Pat. No. 2,940,322 are suitable.

The flow restrictor cartridges are sized slightly shorter than the inside diameter of the pipe upon which they are to be used or have a flexible joint as shown in FIG. 9 providing for longer cartridges. The cartridges have an overall deflated diameter about 20 to about 50 percent of the inside diameter of the pipe in which they are to be used. Adapter cylinder 39 (FIG. 2) or relief cylinder 114 (FIG. 12) has a length such that the bottom of adapter head 19 seats upon gasket 64 at the bottom of cylinder 57 (FIG. 2) or upon the exterior of the pipe (FIG. 12) when the center line of the flow restrictor cartridge, when at right angles to cartridge adapter 15, is along the center line of pipe 63. Thus, adapter cylinder 39 or relief cylinder may be provided in different lengths or extensions to accommodate different length flow restrictor cartridges.

Operation of the pipeline fluid flow restrictor according to embodiments of this invention is best seen by reference to FIGS. 1, 2, 10, 11 and 12. Pipe saddle 56 is attached to pipe 63 with U bolts 62 upstream from the location in which fluid flow is to be restricted. A flow restrictor cartridge, of the type shown in FIG. 6 having drill bit 10 and hole cutter 9 affixed to front end plug 2 is attached to cartridge elbow 14 and maintained in line with cartridge adapter 15 as described above and shown in FIG. 2. Cartridge adapter 15 is engaged at its upper end with the lower end of the boring rod of the cartridge insertion tool. Adapter cylinder 39 is attached to cylinder 57 and the boring-insertion tool 110 with the cartridge is attached to the upper end of adapter cylinder 39. The boring rod, engaged with ratchet head 23 of adapter head 19, is then lowered until drill bit 10 contacts the pipe wall. The process for boring a hole through the wall of pipe 63 and insertion of a flow restrictor cartridge into a pipeline using the arrangement shown in FIG. 2 has been more fully described in our allowed parent application which has been fully incorporated herein by reference. The boring and insertion tool 110 having a separate inflating fluid tube within fluid passage 123 may be used in the same fashion.

The fluid pressure boring and insertion tool with relief cylinder 114 and gate valve 112 as shown in FIG. 12 allowing changing from the boring tool to the flow restrictor cartridge after a hole is bored in the pipeline wall without loss of pipeline fluid is a preferred embodiment. For larger pipelines, particularly, it is preferred to attach the hole cutter directly to boring rod 122 for maximum torque. The same tool may be used for cutting a hole in the pipeline side wall, insertion of the inflatable cartridge, and installation of a completion plug. To use the fluid pressure boring and insertion tool, reference is made to FIGS. 12 and 13. The saddle and saddle adapter tube 111 are installed in the same fashion as described above. Gate valve 112 is screwed onto the open end of saddle adapter tube 111. Yoke 131 is disengaged from boring rod 122 and hole cutter 140 installed on the end of boring rod 122. The tool is installed on the pipeline by screwing the lower end of relief cylinder 114 into the upper end of gate valve 112. Fluid cylinders 124 are moved to an upper position and the hole saw lowered to contact with the pipeline by movement of rotary linear translator 30. Yoke 131 is then engaged with boring rod 122 and rotary linear translator 130 disengaged from boring rod 122. Pressurized fluid is admitted to fluid cylinder 124 through lower fluid supply-exit passage 126 providing steady and controlled downward force through boring rod 122 to hole cutter 140. Hole cutter 140 is manually rotated by a tool attached to attachment means 133 at the top of boring bar 122 and upon rotation the desired hole in pipeline 43 is cut. Following cutting of the hole the fluid pressure in fluid cylinder 124 is relieved, yoke 131 is disengaged from boring rod 122 and hole cutter 140 is retracted to relief cylinder 114 by action of rotary linear translator 130. Gate valve 112 is then closed isolating pipeline 63 from relief cylinder 114 which is then vented through valve 115 and relief cylinder cap 116 unscrewed to allow the boring rod to be moved upwardly for access for removal of hole saw 140 and its replacement by the desired flow restrictor cartridge. Boring rod 122 with the flow restrictor cartridge attached at is lower end is then lowered into relief cylinder 114 and relief cylinder cap 116 tightened. Valve 112 is then opened and the flow restrictor cartridge inserted into the pipeline as described above. It should be noted that alignment of the cartridge elbow to a position perpendicular to the cartridge adapter is not critical, the important aspect being that the elbow is bent to clear the bottom of the pipe and upon inflation, the adapter elbow and flow restrictor cartridge will align itself.

To inflate flexible sleeve 1 of the flow restrictor cartridge, the through flow passage of the rear end plug is placed in communication with the fluid supply means for inflating the flexible sleeve. Compressed gas such as nitrogen or air or pressurized liquid such as water, depending upon the nature of the fluid in the pipe, is introduced into flexible sleeve 1 causing it to inflate. The same fluid, such as nitrogen may be used for both the fluid cylinders of the tool and for inflation of the flow restrictor cartridge sleeve. The compressed gas or pressurized liquid is supplied to a desired pressure which is dependent upon the fluid pressure inside the pipeline and the strength of the flexible sleeve 1. Pressurized liquid may be used for higher pressures and results in less long term leakage of the inflation fluid than compressed gas. Inflated flexible sleeve 1 will exert forces normal to the pipe wall sufficient to seal the pipe and cause restriction or complete stoppage of the flow of fluid inside the pipe. Both friction between the pipe wall and flexible sleeve 1 and the rigid connection of the flexible sleeve to cartridge adapter 15 which is seated within the hole through the pipe and the hole through the pipe saddle will prevent movement of the inflated flexible sleeve by the fluid pressure within the pipe. We have found that to obtain a gas-tight seal with a flow restrictor cartridge of this invention, without sleeve retainer arms, in polyvinylchloride pipe, a flexible latex rubber sleeve must be inflated to a pressure in the order of 1.3 times the pressure of the fluid in the pipe. After inflation, the insertion tool may be removed and can be used at another location.

When higher pipeline pressures and/or larger pipeline diameters are encountered, a flow restrictor cartridge of the type shown in FIGS. 10, 11 or 11A may be used to provide stoppage of pipeline fluid flow at pipeline pressures of up to 75 to 125 psig. These cartridges, having sleeve retainer arms, would be most frequently used in pipelines greater than about 4 inches and up to about 12 inches in diameter. It is also preferred to utilize multiple flexible sleeves at the higher pressures and pipeline diameters, particularly to protect against abrasion. The cartridges with sleeve retainer arms are inserted into the pipeline in the same manner as described above. When the direction of flow of fluid within the pipeline is known, a flow restrictor cartridge having sleeve retainer arms only extending from the rear end plug, as shown in FIG. 11, may be used with the retainer arms extending from the downstream end of the flow restrictor cartridge. In this case the pipeline pressure will exert force on the upstream end of the inflated flexible sleeve while the sleeve retainer arms will exert force on the other end to restrict axial expansion and permit greater pressure within the inflated sleeve, thereby providing greater force to the pipeline fluid flow restriction at higher pipeline pressures. The flat sleeve retainer means acting as a conical iris as shown in FIGS. 11 and 11A may cover preferably nearly all of the end area of the inflated sleeve for withstanding greater pressures of pipeline fluid. When the direction of flow of fluid within the pipeline is not known, a flow restrictor cartridge having sleeve retainer arms extending from both the rear and the front end plugs, as shown in FIG. 9, may be used. The effect of the sleeve retainer arms in use is best seen in FIG. 10. The angle of end 87 of sleeve retainer arm 84 provides firm engagement with the interior of pipe 63, thus supporting the retainer arm at both ends. As best seen in FIG. 10, when flexible sleeve 1 is inflated, sleeve retainer arms 84 rotate outwardly in socket 86 until they engage the interior surface of the pipe wall restricting the axial expansion of flexible sleeve 1. A sufficient number of sleeve retainer arms 84 are provided to restrain at least one end portion of flexible sleeve 1, thereby allowing stoppage of greater pipeline pressures. The number of sleeve retainer arms is dependent upon the pipeline diameter and the width of each arm which should be sufficiently wide to restrain the flexible sleeve and to prevent creating ballooning areas causing weakness in the flexible sleeve. This provides greater resistance to movement within the pipline and closure at higher pressures. It is preferred that the sleeve retainer arms be at an angle of about 40° to 60° from the center line of the cartridge when the sleeve is inflated.

When the need for fluid flow restriction is over and flow of fluid inside the pipeline desired, flexible sleeve 1 may be readily deflated by releasing the pressurized fluid within the flexible sleeve. In cases where cartridges having sleeve retainer arms are used, when sleeve 1 is deflated, action of spring 88 causes the sleeve retainer arms to return to their retracted position as shown in FIGS. 8 and 9. The bendable elbow assembly and flow restrictor cartridge may be removed by pulling them out of the pipe through the hole in the pipeline side wall. Cylinder 57 or saddle adapter tube 111 may then be capped or plugged and the pipeline put back into full service. The saddle adapter tube 111 may be plugged using boring-insertion tool 110 as described above. The hole in the pipe wall of low pressure piplines may be temporarily plugged by a compression plug having a bolt threaded into a washer on the interior of the wall, a latex rubber sleeve, and a loose washer on the outside of the wall under the bolt head. The assembly is inserted into the hole and bolt tightened on the threaded interior washer causing the sleeve to be squeezed and fill the hole.

When high strength steel pipe is involved, high torque is necessary in the hole boring. In such case, a gate valve or a flapper valve is installed allowing drilling with conventional hole cutters through the valve and shutting of the valve during attachment of the insertion assembly and cartridges of this invention. These methods reduce leakage which is particularly important on plastic gas pipelines due to potential fire hazard caused by presence of static electricity.

A typical boring-insertion tool as described above designed for operation with pipelines of 4 inch diameters or less will be compact and lightweight, about 3.5 feet from the bottom of the adapter cylinder to the top of the yoke and weighs about 25 pounds. The boring-insertion tool of this invention provides a single tool for pipeline flow restriction, providing boring a hole through the pipeline side wall, insertion and inflation of an inflatable flow restrictor, removal of the flow restrictor, and attachment of a completion plug, all with minimal loss of pipeline fluid and minimal damage to the pipeline itself. Various embodiments of flow restrictors of the invention provide rapid flow restriction in a wide range of pipeline diameters, up to about 12 inches in diameter, and for a wide range of pipeline fluid pressures, up to about 125 psig.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A pipeline fluid flow restrictor cartridge for insertion through a hole in the pipeline side wall comprising; a substantially circular rear end plug, a substantially circular front end plug, a cylindrical radially expandable flexible sleeve having an opening in the central portion of one end and attached in substantially fluid-tight relation to the periphery of said rear end plug at said opening and said front end plug at the opposite end, said rear end plug having a through flow passage having an interior opening in the interior face of said rear end plug in communication with the interior portion of said flexible sleeve and an opposite exterior opening in the exterior face of said rear end plug adapted for communication with supply means providing fluid for inflating said flexible sleeve, said exterior face of said rear end plug having attachment means for engagement with mating attachment means of an insertion assembly, said flow restrictor cartridge having an overall deflated diameter about 20 to 50 percent the inside diameter of the pipeline in which it is to be used, said flow restrictor cartridge having sleeve retainer arm sockets in the periphery of at least one of said end plugs and sleeve tetainer arms pivotally mounted in said sockets, said retainer arms being of suitable length to pivot outwardly against the interior wall of said pipeline at an angle of about 40° to about 60° with the axis of said flow restrictor cartridge, thereby restricting axial expansion of said flexible sleeve upon its inflation.

2. The restrictor cartridge of claim 1 wherein said front and rear plugs are attached to a central cylinder passing through the central portion of said flexible sleeve.

3. The restrictor cartridge of claim 2 wherein said rear end plug flow passage is in communication with said central cylinder, said central cylinder having a bleed hole to provide passage of fluid for inflation to the volume adjacent said flexible sleeve.

4. The restrictor cartridge of claim 1 wherein said front end plug has a mating member extending rearwardly and in engagement with a mating member extending forwardly from said rear end plug permitting lengthwise slide of said mating members when said flexible sleeve is extended upon inflation.

5. The restrictor cartridge of claim 1 wherein said retainer arms are forwardly extending and mounted in said sleeve retainer sockets in the periphery of said gear end plug.

6. The restrictor cartridge of claim 5 wherein said front end plug has sleeve retainer arm sockets in its periphery and sleeve retainer arms pivotally mounted in said sockets, said retainer arms being of suitable length to pivot outwardly against the interior wall of said pipeline at an angle of about 40° to about 60° with the axis of said flow restrictor cartridge, thereby restricting axial expansion of said flexible sleeve upon its inflation.

7. The restrictor cartridge of claim 6 wherein said front and rear plugs are attached to a central cylinder passing through the central portion of said flexible sleeve.

8. The restrictor cartridge of claim 7 wherein said rear end plug flow passage is in communication with said central cylinder, said central cylinder having a bleed hole to provide passage of fluid for inflation to the volume adjacent said flexible sleeve.

9. The restrictor cartridge of claim 6 wherein said front end plug has a mating member extending rearwardly and in engagement with a mating member extending forwardly from said rear end plug permitting lengthwise slide of said mating members when said flexible sleeve is extended upon inflation.

10. The flow restrictor cartridge of claim 1 wherein said flow restrictor cartridge has a deflated length less than the inside diameter of the pipeline in which it is to be used.

11. The flow restrictor cartridge of claim 1 wherein said front and rear end plugs are attached to a two-section member passing through the central portion of said sleeve, each of said sections pivotally engaged with the adjacent section and each of said sections having a length less than the inside diameter of the pipeline in which it is to be used.

12. The flow restrictor cartridge of claim 1 wherein said sleeve retainer arms are in the form of an iris diaphragm which when pivoted outwardly against the interior wall of said pipeline covers all of one end of said expandable flexible sleeve when inflated.

13. The flow restrictor cartridge of claim 1 in combination with an insertion assembly comprising: a cartridge elbow and a cartridge adapter cylinder, said cartridge elbow having a mating attachment means at one end mated with said cartridge rear end plug attachment means and pivot means at the other end, said cartridge adapter cylinder having pivot means at one end and a flanged adapter head at the other end, the pivot means of the cartridge elbow and the pivot means of the cartridge adapter cylinder engaging to provide rotation of the cartridge elbow from a position having its axis parallel to that of the cartridge adapter cylinder to a position extending perpendicular to the axis of the cartridge adapter; spring means urging said cartridge elbow toward a position perpendicular to said cartridge adapter; retaining means for retaining said cartridge elbow in a position parallel to said cartridge adapter; and communication means providing communication, when the cartridge elbow and adapter cylinder are perpendicular, with said rear plug through flow passage and a fluid pressure supply means.

14. The combination flow restrictor cartridge and insertion assembly of claim 13 wherein said retaining means comprises a notch at the end of said cartridge elbow pivot means and a tube extending through said adapter cylinder into said notch to hold said cartridge elbow and said adapter cylinder in parallel relation to each other.

15. The combination flow restrictor cartridge and insertion assembly of claim 14 wherein said communication means comprises a hole in the central portion of said cartridge elbow in communication, when said cartridge elbow and said cartridge adapter cylinder are perpendicular, through said tube to said fluid pressure supply means at one end and said rear plug through flow passage at its other end.

16. The combination flow restrictor cartridge and insertion assembly of claim 13 wherein said retaining means comprises a sleeve slidably engaged over said pivot means to hold said cartridge elbow and said adapter cylinder in parallel relation to each other.

17. The combination flow restrictor cartridge and insertion assembly of claim 16 wherein said communication means comprises a hole in the central portion of said cartridge elbow in communication with a flexible tube allowing said cartridge elbow and said cartridge adapter cylinder to pivot, said flexible tube in communication with said fluid pressure supply means at one end and said rear plug through flow passage at its other end.

18. The pipeline flow restrictor cartridge and insertion assembly of claim 13 in combination with a boring-insertion tool comprising: a hollow boring rod with a central fluid passage and having handle means for rotation at one end and engagement means engaging said adapter cylinder head at the other end extending in rotatable and engageable relation through a frictional linear advancing means, said central fluid passage engageable for fluid communication with said inflation fluid supply means at said one end and with the interior of said flexible sleeve at said other end; at least two support rods substantially parallel to said boring rod and fixed in relation to said advancing means; fluid cylinders in fixed relation to said support rods, said fluid cylinders having double acting pistons in fixed relation to a relief cylinder which is open at one end for attachment to said pipeline and has a removable cap at the other end, said cap in slidable, rotatable and substantially gas sealed relation with said other end of said boring rod; fluid supply and control means to supply pressurized fluid to said fluid cylinders on both sides of said double action pistons, fluid pressure on the lower surface of said pistons forcing said boring rod toward said pipeline and fluid pressure on the upper surface of said pistons forcing said boring rod away from said boring rod when said linear advancing means is disengaged and a yoke maintains said boring rod and said support rods in fixed linear relation.

19. The pipeline flow restrictor cartridge and insertion assembly and boring-insertion tool of claim 18 wherein said open end of said relief cylinder is engaged in fluid-tight relation to one side of a gate valve, the other side of said gate valve in fluid-tight relation with said pipeline side wall in the area of an insertion hole in said side wall for insertion of said restrictor cartridge.

20. The pipline flow restrictor cartridge and insertion assembly and boring-insertion tool of claim 19 wherein said insertion hole has a diameter about 20 to about 50 percent the inside diameter of said pipeline.

21. The flow restrictor cartridge of claim 5 wherein said sleeve retainer arms are in the form of an iris diaphragm which when pivoted outwardly against the interior wall of said pipeline covers all of the rear end of said expandable flexible sleeve when inflated.

22. The flow restrictor cartridge of claim 6 wherein said sleeve retainer arms are in the form of an iris diaphragm which when pivoted outwardly against the interior wall of said pipeline covers all of the rear end and all of the front end of said expandable flexible sleeve when inflated.

* * * * *